US011078004B2

(12) United States Patent
Robert et al.

(10) Patent No.: US 11,078,004 B2
(45) Date of Patent: Aug. 3, 2021

(54) MULTILAYER FILM FOR RECLOSABLE PET PACKAGING

(71) Applicant: BOSTIK SA, La Plaine Saint-Denis (FR)

(72) Inventors: Christophe Robert, Thourotte (FR); Marc Brestaz, Compiegne (FR); Ludovic Sallet, Compiegne (FR); Jeremie Peyras-Carratte, Pont Sainte Maxence (FR)

(73) Assignee: BOSTIK SA, La Plaine Saint-Denis (FR)

( * ) Notice: Subject to any disclaimer, the term of this patent is extended or adjusted under 35 U.S.C. 154(b) by 0 days.

(21) Appl. No.: 15/745,621

(22) PCT Filed: Jul. 12, 2016

(86) PCT No.: PCT/FR2016/051796
§ 371 (c)(1),
(2) Date: Jan. 17, 2018

(87) PCT Pub. No.: WO2017/013330
PCT Pub. Date: Jan. 26, 2017

(65) Prior Publication Data
US 2018/0215522 A1  Aug. 2, 2018

(30) Foreign Application Priority Data
Jul. 17, 2015  (FR) ..................... 15 56805

(51) Int. Cl.
*B65D 77/20* (2006.01)
*B32B 7/12* (2006.01)
*B32B 25/14* (2006.01)
*B32B 27/08* (2006.01)
*B32B 27/36* (2006.01)
*B32B 27/30* (2006.01)
*B65D 43/02* (2006.01)

(52) U.S. Cl.
CPC ............ *B65D 77/2096* (2013.01); *B32B 7/12* (2013.01); *B32B 25/14* (2013.01); *B32B 27/08* (2013.01); *B32B 27/302* (2013.01); *B32B 27/36* (2013.01); *B65D 43/02* (2013.01); *B32B 2270/00* (2013.01); *B32B 2274/00* (2013.01); *B32B 2307/31* (2013.01); *B32B 2435/02* (2013.01); *B65D 2577/2025* (2013.01)

(58) Field of Classification Search
None
See application file for complete search history.

(56) References Cited

U.S. PATENT DOCUMENTS

| | | | | |
|---|---|---|---|---|
| 4,765,999 A | * | 8/1988 | Winter | ..................... B32B 27/36 426/113 |
| 6,302,290 B1 | * | 10/2001 | Engelaere | ................ B29C 65/18 156/580 |
| 7,422,782 B2 | | 9/2008 | Headt et al. | |
| 8,617,673 B1 | * | 12/2013 | Desai | ..................... B32B 27/08 428/34.1 |
| 2005/0100729 A1 | * | 5/2005 | Peiffer | .................... B32B 27/36 428/323 |
| 2006/0172131 A1 | * | 8/2006 | Haedt | ....................... B32B 7/06 428/336 |
| 2010/0003377 A1 | * | 1/2010 | Brennan | ................. B32B 27/18 426/106 |
| 2013/0029553 A1 | * | 1/2013 | Trouilhet | .................. B32B 7/12 442/327 |
| 2013/0233911 A1 | * | 9/2013 | Robert | ...................... B32B 7/12 229/5.84 |

FOREIGN PATENT DOCUMENTS

| | | |
|---|---|---|
| EP | 1685954 A1 | 8/2006 |
| WO | 9719867 A1 | 6/1997 |
| WO | 2012045950 A1 | 4/2012 |
| WO | WO-2014110657 A1 * | 7/2014 ......... B29C 67/0014 |

OTHER PUBLICATIONS

Bode—multi-layer blown film dies—Flex.Pack.Symp.—B—2009 (Year: 2009).*
Eastman Eastar copolyester 6763 (Year: 2012).*

(Continued)

*Primary Examiner* — Callie E Shosho
*Assistant Examiner* — John Vincent Lawler
(74) *Attorney, Agent, or Firm* — Millen, White, Zelano and Branigan, P.C.

(57) ABSTRACT

A multilayer film:
an adhesive layer A: an extrudable hot-melt self-adhesive composition;
a complexable thin layer B; and
a heat-sealable and cleavable layer C of a linear copolyester C1 obtained by polycondensation of a composition of monomers:
at least one diol (i),
at least one compound (ii) chosen from terephthalic acid or a diester derivative and
at least one compound (iii) chosen from an aromatic or aliphatic dicarboxylic acid or a diester or anhydride derivative;
the amounts of the monomers (i), (ii) and (iii) used in the polycondensation such that the softening temperature of C1 is below 190° C.

A process for producing the multilayer film by co-extrusion blow-molding.

A resealable packaging comprising a PET-based receptacle and a seal of said multilayer film, the heat-sealable and cleavable layer (C) of which is heat-sealed on the receptacle.

15 Claims, No Drawings

(56) References Cited

OTHER PUBLICATIONS

Pub-Chem—Azelaic acid_C9H1604—May 27, 2020 (Year: 2020).*
International Search Report for PCT/FR2016/051796 dated Oct. 26, 2016.
Database Registry [Online] Chemical Abstracts Service, Columbus, Ohio, US; XP002757505.
Database Registry [Online] Chemical Abstracts Service, Columbus, Ohio, US; XP002757506.
Database Registry [Online] Chemical Abstracts Service, Columbus, Ohio, US; XP002757507.

* cited by examiner

MULTILAYER FILM FOR RECLOSABLE PET PACKAGING

The present invention relates to a multilayer film comprising a layer consisting of an extrudable hot-melt self-adhesive composition and to a process for producing said film, which comprises co-extrusion blow-molding. It also relates to resealable packagings, the receptacle of which consists of poly(ethylene terephthalate), also known as polyethylene terephthalate (PET), and the lid of which consists of said multilayer film.

Multilayer films used in the resealable packaging field are known in particular through application WO 2012/045950. These packagings are used in the food-processing industry and mass marketing for packaging perishable foods, in particular fresh products.

These packagings generally comprise a container (or receptacle) and a seal forming a lid, which are hermetically attached to one another by welding. After the seal has been opened for the first time and a portion of the food product contained in the receptacle has been consumed, the user can reposition the seal on the receptacle, so as to reseal the packaging substantially hermetically, and to consequently, as appropriate, after placing it in a refrigerator, store the remaining portion of the product. A sequence of reopenings and resealings is also possible.

The receptacle of these packagings generally comprises a PET sheet, having a minimum thickness of 100 μm, generally of between 200 and 1000 μm. This sheet is thermoformed so as to have a flat bottom on which the food product rests, and a perimeter in the form of a flat band. This perimeter, which is generally parallel to the bottom, is bonded by heat-welding to the flexible and flat seal, which consists of a multilayer film (also described as complex or composite film) which has a thickness of generally between 40 and 150 μm, and which is often denoted by the name sealing film.

During the opening of the packaging by the consumer, the sealing film is manually separated from the receptacle at the flat band of its perimeter. This operation reveals an adhesive layer at said flat band, both on the sealing band and on the receptacle band which were previously bonded. These two (continuous or noncontinuous) adhesive layers, referred to as "daughters", result from the rupturing of an initial or "mother" adhesive layer or, optionally, from its separation (or detachment) from one of the two layers of the multilayer complex film which are adjacent to it. The initial adhesive layer is therefore one of the layers of said multilayer complex film which is itself an element included in the composite sheet which constitutes the sealing film.

The two daughter adhesive layers that are present, after the packaging has been opened, on the bands located on the respective perimeter of the receptacle and of the seal can be placed facing one another. Thus, it is sufficient for the consumer to reposition the seal on the receptacle, in accordance with their position in the packaging before opening, in order to bring the two bands of daughter adhesive layers back into contact. Simple manual pressure then allows the consumer to obtain the resealing of the packaging.

The adhesive substance which constitutes the mother and daughter adhesive layers is thus necessarily a pressure-sensitive adhesive composition (or PSA).

In most resealable packagings available on the market, the sealing film is a multilayer film which comprises:
- a layer A consisting of an extrudable hot-melt self-adhesive composition,
- a complexable thin layer B, and
- a heat-sealable and cleavable thin layer C,
the layer A providing the tie between B and C.

Such a film offers the desired opening and resealing properties for the packaging.

The complexable layer B can be complexed (or laminated) with other layers for the preparation of the multilayer film, for example with a rigid layer for improving the mechanical strength of said film.

The heat-sealable (term synonymous with heat-weldable) and cleavable layer C often consists of a polyolefin, more particularly of polyethylene (PE) because of its heat-sealability at low temperature. It makes it possible to provide:
- during the packaging of the food product, the closing of the packaging by heat-welding of the sealing film on the receptacle, at the flat band of the perimeter, then
- the first opening of the packaging carried out manually by the consumer, and obtained by rupturing the cleavable zone located at the surface of C.

The performing of this first opening thus begins with the rupturing of said cleavable zone, and then continues with the propagation of the rupturing along the adhesive layer A, until there is complete separation of the seal from the receptacle. This propagation takes place by rupturing the adhesive layer A in its body (termed cohesive rupture) and/or by rupturing the interface of said layer A with one and/or the other of the two adjacent layers B or C (termed adhesive rupture).

The heat-welding of the sealing film on the receptacle is carried out by means of bars (or clamping jaws) by bringing the zones to be assembled into hot contact under pressure, resulting in a solid assembly by interpenetration of the constituent materials of the layer C of the film and of the superficial layer of the perimeter of the receptacle. Such an operation requires a relative proximity of the melting points (or softening temperatures) of the materials to be heat-welded and a certain similarity in their chemical nature.

Consequently, it is very difficult, industrially, to heat-weld a multilayer sealing film of which the weldable and cleavable layer C consists of a polyolefin (in particular of polyethylene or PE, the melting point Mp of which can range between 90 and 110° C. depending on the grades), on a receptacle consisting of PET. Indeed the softening temperature of an amorphous PET can range from 140 to 180° C. and the Mp of a semicrystalline PET can range from 220 to 260° C.

In order to overcome this difficulty the receptacle of commercially available packagings is thermoformed from a multilayer sheet (also termed complex or composite sheet) which comprises a PE layer in addition to the PET layer, said sheet being produced by hot co-extrusion at a temperature of approximately 250° C. The thermoforming is performed such that the PE layer is located at the surface of the horizontal band of the perimeter, on the side opposite the flat bottom of the receptacle. The heat-welding of the PE layer C is thus conveniently carried out under industrial conditions. However, manufacturers which produce such PET/PE complex sheets and form them by heating are confronted with the problem of the recycling of the non-compliant products resulting from the manufacture of said sheets, precisely owing to the presence of the two materials PET and PE that cannot be separated.

In order to overcome the difficulty of heat-welding a weldable and cleavable polyolefin-based layer C on a PET receptacle, application US2013/0029553 discloses, generally, (cf § [0018]) a multilayer structure for resealable packaging comprising:

a heat-sealable layer, a layer of self-adhesive (also called PSA for Pressure Sensitive Adhesive), a tie layer, and a structural layer;

in which the heat-sealable layer (cf § [0019]) comprises an amorphous PET (or APET) which has a melting point above 200° C., said term "APET" denoting in this reference (cf § [0052]) a semi-aromatic homopolymeric or copolymeric polyester.

However, the process for preparing such a multilayer structure by co-extrusion is a real challenge, according to this prior art (cf [0013] and [0056]). This is because the minimum temperature for processing by melting said APET is above 250° C., whereas the PSA, which constitutes the layer adjacent to the heat-sealable APET layer, has a risk of degrading during its processing at such temperature.

The objective of the present invention is to avoid such a risk, by providing a multilayer film that can be used for a packaging with easy opening and resealing, the heat-weldable and cleavable layer C of which can be heat-welded on a receptacle consisting of PET, said film possibly also being produced by a co-extrusion blow-molding process using a lower temperature, in particular at the extrusion head, and more particularly a temperature below 250° C., preferably below 220° C. and even more preferentially below 200° C.

The implementation of the co-extrusion process at a lower temperature is also advantageous in terms of energy saving and of productivity of the process, such as, for example, a shorter production-line start-up time.

Another objective of the present invention is therefore to provide a multilayer film that can be used as resealable packaging seal, the heat-weldable and cleavable layer of which makes it possible to heat-weld said seal on a receptacle consisting 100% of PET.

Another objective of the present invention is therefore to provide a multilayer film which, once heat-welded on PET, has:

a 1st-opening force which is suitable for easy opening of the packaging by the consumer, and a 2nd-opening force which provides, after the 1st resealing of the packaging by the consumer, a substantially hermetic resealing.

Another objective of the present invention is to provide a multilayer film capable of being produced by co-extrusion from raw materials conditioned in the form of granules, in particular by co-extrusion blow-molding, for the purpose of producing a resealable packaging.

It has presently been found that these objectives can be totally or partly obtained by means of the multilayer film according to the invention which is described hereinafter.

A subject of the present invention is therefore first and foremost a multilayer film comprising:

an adhesive layer A having a thickness ranging from 7 to 50 µm and consisting of an extrudable hot-melt self-adhesive composition a which has a melt flow index (or MFI), measured for a temperature of 190° C. and a total weight of 2.16 kg, ranging from 0.01 to 200 g/10 minutes and which comprises, on the basis of the total weight of said composition a:

from 40% to 70% by weight of a composition a1 of styrene block copolymers comprising at least one elastomer block, said composition a1 consisting, on the basis of its total weight:

of 30% to 90% by weight of at least one diblock copolymer chosen from the group comprising SI, SBI, SIB, SB, SEB and SEP, and of 10% to 70% by weight of at least one triblock copolymer chosen from the group comprising SIS, SIBS, SBS, SEBS and SEPS;

the total content of styrene units of said composition a1 ranging from 10% to 40% by weight on the basis of the total weight of a1; and from 30% to 60% by weight of one or more tackifying resins a2 having a softening temperature of between 5 and 140° C.;

a complexable thin layer B consisting of a thermoplastic b; and a heat-sealable and cleavable layer C;

the layers B and C being linked to one another by the layer A; and said film being characterized in that the layer C consists of a composition c comprising, on the basis of the total weight of c, a content by weight of at least 95% of at least one linear copolyester C1 obtained by polycondensation of a composition m of monomers comprising:

at least one diol (i), at least one compound (ii) chosen from terephthalic acid or a diester derivative thereof, optionally substituted with an alkyl radical, and at least one compound (iii) chosen from an aromatic or aliphatic dicarboxylic acid or a diester or anhydride derivative thereof;

the amounts of the monomers (i), (ii) and (iii) used in the polycondensation being such that the softening temperature of C1 is below 190° C.

Surprisingly with respect to the teaching of document US 2013/0029553, it has been found that certain linear copolyesters, the softening temperature of which is below 190° C., can be processed by co-extrusion with constituent materials of the adjacent layers of the multilayer film according to the invention, at temperatures well below 250° C., and more particularly at temperatures below 220° C., preferably below 200° C. and even more preferentially below 180° C. As a result of this, it is possible to prepare said film by means of an industrial co-extrusion process without any risk of degradation or disruption of the self-adhesive adjacent layer A. Furthermore, said film, after it has been incorporated into a resealable packaging of which the receptacle consists of PET, is easy for the consumer to open and can then, where appropriate, be substantially hermetically resealed.

Description of the Composition c of the Layer C:

The heat-sealable and cleavable layer C consists of a composition c which comprises, on the basis of the total weight of c, a content by weight of at least 95% of at least one linear copolyester C1, the softening temperature of which is below 190° C.

The softening temperature (or point) is also denoted, in the adhesives field, by the expression "ring and ball softening point", often abbreviated to R & B.

This temperature is determined in accordance with the standardized ASTM E 28 test, the principle of which is the following. A brass ring with a diameter of approximately 2 cm is filled with the copolyester (or resin) to be tested, in the molten state. After cooling to ambient temperature, the ring and the solid resin are placed horizontally in a thermostated glycerol bath, the temperature of which can vary by 5° C. per minute. A steel ball with a diameter of approximately 9.5 mm is centered on the disk of solid resin. The softening temperature is, during the phase of rise in the temperature of the bath at a rate of 5° C. per minute, the temperature at which the solid copolyester disk, after it has passed into the viscous fluid state (corresponding to melting thereof, in the case of a semicrystalline copolyester), yields by a height of 25.4 mm under the weight of the ball.

In the case of a semicrystalline copolyester, the softening temperature thus obtained is therefore higher than the melting temperature, as measured by the usual techniques of differential scanning calorimetry (DSC).

Preferably, the softening temperature of the linear copolyester C1 is below 180° C., and more preferentially below 175° C.

The softening temperature of the linear copolyester C1 is generally above 95° C. and, usually, above 110° C.

The linear copolyester C1 is a random copolymer obtained by polycondensation of a composition m of monomers comprising:
- at least one diol (i),
- at least one compound (ii) chosen from terephthalic acid or a diester derivative thereof, optionally substituted with an alkyl radical, and
- at least one compound (iii) chosen from an aromatic or aliphatic dicarboxylic acid or a diester or anhydride derivative thereof.

The diol (i) can be chosen from ethylene glycol, diethylene glycol, trimethylene glycol, hexamethylene glycol, propylene glycol (or propane-1,2-diol), propane-1,3-diol, butanediol (–1,4, –1,3 or –1,2), neopentyl glycol, 2-methyl-1,3-propanediol, hexanediol, trimethylolpropane or else cyclohexanedimethanol.

The compound (ii) is chosen from terephthalic acid or a diester derivative thereof, such as dimethyl terephthalate.

The compound (iii) can for example be chosen from isophthalic acid, adipic acid, azelaic acid, sebacic acid, cyclohexanedicarboxylic acid, dodecanedicarboxylic acid, 1,10-decanedicarboxylic acid, succinic acid, phthalic anhydride and maleic anhydride.

Linear copolyesters C1 that are advantageously suitable for the multilayer film according to the invention, because of their softening temperature, are obtained by polycondensation of a composition m consisting, on the basis of contents expressed as mol % per 100 mol of monomers, of:
- approximately 50% of diol (i),
- from 10% to 38%, preferably from 10% to 34% by weight, of compound (ii), and
- from 12% to 40%, preferably from 16% to 40% by weight, of compound (iii).

Particularly advantageous compositions m are obtained using ethylene glycol as diol (i).

The linear copolyesters C1 thus obtained have a weight-average molar mass Mw included in a range of from 20 to 100 kDa. Unless otherwise indicated, the weight-average molar masses Mw that are indicated in the present text are expressed in daltons (Da) and are determined by Gel Permeation Chromatography or Size Exclusion Chromatography, the column being calibrated with polystyrene standards.

The linear copolyesters C1 can have an amorphous or semicrystalline structure depending on the monomer content of the composition m. When they have a semicrystalline structure, the melting point of the linear copolyesters C1 is generally below 195° C.

The linear copolyester C1 included in the constitutive composition c of the heat-sealable and cleavable layer C is obtained by polycondensation of the composition m comprising the abovementioned monomers.

When some among the monomers (ii) and optionally (iii) are diester derivatives, for instance methyl diester derivatives, said monomers are, in a 1st step, mixed with one or more diol monomers (i), said mixture being brought to a temperature that can range up to 190° C., so as to carry out a transesterification reaction, preferably in the presence of a titanium-based or zinc-based catalyst, and to eliminate the methanol formed. In a 2nd step, the monomers (ii) and optionally (iii) which are diacids are added, as a mixture with one or more diol monomers (i), the reaction medium being brought to a temperature that can range up to 230° C., so as to carry out the esterification reaction and to eliminate the water formed. Finally, in a 3rd step, the pressure is reduced to a value of less than approximately 5 mbar, and the reaction medium is brought to a higher temperature, up to a value in the region of 250° C., in order to increase the chain length of the copolyesters so as to achieve a Mw included in the range previously indicated.

In addition to the linear copolyester C1, the constituent composition c of the heat-sealable and cleavable layer C of the multilayer film according to the invention also comprises up to 5%, preferably up to 0.5% by weight, of one or more additives, such as anti-blocking or glide agents, for instance erucamide, oleamide, behenamide, stearamide, palmitamide, ethylene distearamide, ethylene bisoleamide, silica or else talc.

Description of the Composition b of the Layer B:

The complexable thin layer B included in the multilayer film according to the invention consists of a thermoplastic b which can be advantageously chosen from:
- polyethylene (PE),
- polypropylene (PP),
- a copolymer based on ethylene and propylene,
- polyamide (PA),
- polyethylene terephthalate (PET), or else
- a copolymer based on ethylene, for instance a maleic anhydride-grafted copolymer, a copolymer of ethylene and of vinyl acetate (EVA), a copolymer of ethylene and of vinyl alcohol (EVOH), a copolymer of ethylene and of an alkyl acrylate such as methyl acrylate (EMA) or buyl acrylate (EBA),
- polystyrene (PS),
- polyvinyl chloride (PVC),
- polyvinylidene fluoride (PVDF),
- a lactic acid polymer (PLA), or
- a polyhydroxyalkanoate (PHA).

The layer B can be complexed (or laminated) with other layers for the preparation of the packaging, for example with a rigid layer for preparing the receptacle.

Description of the Composition a of the Layer A:

The composition a is an extrudable hot-melt self-adhesive composition, the melt flow index (or MFI) of which can range from 0.01 to 200 g/10 minutes.

The melt flow index (or MFI) is measured at 190° C. and for a total weight of 2.16 kg, in accordance with condition d) of the standard ISO 1133. The MFI is the weight of composition (previously placed in a vertical cylinder) that flows in 10 minutes through a die with a diameter of 2.095 nm, under the effect of a pressure exerted by a charged piston having the total weight of 2.16 kg. Unless otherwise mentioned, the MFI values indicated in the present text were measured under these same conditions.

The hot-melt self-adhesive compositions a having an MFI ranging from 2 to 70 g/10 minutes are more particularly preferred.

The composition a comprises, on the basis of the total weight of said composition a:
- from 40% to 70% by weight of a composition a1 of styrene block copolymers comprising at least one elastomer block, said composition a1 consisting, on the basis of its total weight:

of 30% to 90% by weight of at least one diblock copolymer chosen from the group comprising SI, SBI, SIB, SB, SEB and SEP, and of 10% to 70% by weight of at least one triblock copolymer chosen from the group comprising SIS, SIBS, SBS, SEBS and SEPS;

the total content of styrene units of said composition a1 ranging from 10% 40% by weight on the basis of the total weight of a1; and from 30% to 60% by weight of one or more tackifying resins a2 having a softening temperature of between 5 and 140° C.

The composition a1 which is included in the constituent HMPSA composition a of the adhesive layer A comprises one or more styrene block copolymers, having a weight-average molar mass Mw of generally between 50 kDa and 500 kDa.

These styrene block copolymers consist of blocks of various polymerized monomers including at least one polystyrene block, and are prepared by radical-polymerization techniques.

Unless otherwise indicated, the weight-average molar masses $M_w$ that are given in the present text are expressed in daltons (Da) and are determined by Gel Permeation Chromatography, the column being calibrated with polystyrene standards.

The triblock copolymers include 2 polystyrene blocks and 1 elastomer block. They can have various structures: linear, star (also called radial), branched or else comb. The diblock copolymers include 1 polystyrene block and 1 elastomer block.

The triblock copolymers have the general formula:

ABA (I)

in which:

A represents a styrene (or polystyrene) non-elastomer block, and

B represents an elastomer block which may be:

polyisoprene. The block copolymer then has the structure: polystyrene-polyisoprene-polystyrene and has the name: SIS;

polyisoprene followed by a polybutadiene block. The block copolymer then has the structure: polystyrene-polyisoprene-polybutadiene-polystyrene and has the name: SIBS;

polybutadiene. The block copolymer then has the structure: polystyrene-polybutadiene-polystyrene and has the name: SBS;

totally or partially hydrogenated polybutadiene. The block copolymer then has the structure: polystyrene-poly(ethylenebutylene)-polystyrene and has the name: SEBS;

totally or partially hydrogenated polyisoprene. The block copolymer then has the structure: polystyrene-poly(ethylenepropylene)-polystyrene and has the name: SEPS.

The diblock copolymers have the general formula:

A-B (II)

in which A and B are as defined previously.

When the composition a1 comprises several triblock styrene copolymers, the latter being chosen from the group comprising SIS, SBS, SEPS, SIBS and SEBS, it is clearly understood that said triblocks can belong to just one or to several of these 5 copolymer families. The same is true, mutatis mutandis, for the diblock copolymers.

It is preferred to use a composition a1 comprising a triblock copolymer and a diblock copolymer having the same elastomer block, owing in particular to the fact that such blends are commercially available.

According to one particularly preferred implementation variant, the content of diblock copolymer in the composition a1 can range from 40% to 90%, preferably from 50% to 90%, even more preferentially from 50% to 60%.

According to one particularly advantageous embodiment of the constituent composition a of the layer A included in the multilayer film according to the invention, the composition a1 consists of an SIS triblock copolymer and of an SI diblock copolymer. In this case, the total content of styrene units in the composition a1 preferably ranges from 10% to 20%.

The triblock copolymers included in the composition a1 preferably have a linear structure.

The styrene block copolymers comprising an elastomer block, in particular of SI and SIS type, that can be used in the composition a) are commercially available, often in the form of triblock/diblock blends.

Kraton® D1113BT from the company Kraton and Quintac® 3520 from the company Zeon Chemicals are examples of compositions a1 consisting of SIS and SI.

Kraton® D1113BT is a composition of which the overall content of styrene units is 16%, and which consists of 45% of linear SIS triblock copolymer of $M_w$ approximately 250 kDa, and 55% of SI diblock copolymer of $M_w$ approximately 100 kDa. Quintac® 3520 is a composition which consists, respectively, of 22% and of 78% of linear SIS triblock ($M_w$ approximately 300 kDa) and of SI diblock ($M_w$ approximately 130 kDa), and the total content of styrene units of which is 15%.

The constituent HMPSA composition a of the layer A also comprises one or more tackifying resins a2 having a softening temperature of between 5 and 140° C.

The tackifying resin(s) a2 that can be used have weight-average molar masses $M_w$ of generally between 300 and 5000 Da and are chosen in particular from:

(i) rosins of natural origin or modified rosins, such as, for example, the rosin extracted from pine gum, wood rosin extracted from tree roots and derivatives thereof which are hydrogenated, dehydrogenated, dimerized, polymerized or esterified with monoalcohols or polyols, such as glycerol;

(ii) resins obtained by hydrogenation, polymerization or copolymerization (with an aromatic hydrocarbon) of mixtures of unsaturated aliphatic hydrocarbons having approximately 5, 9 or 10 carbon atoms resulting from petroleum fractions;

(iii) terpene resins generally resulting from the polymerization of terpene hydrocarbons, such as, for example, monoterpene (or pinene), in the presence of Friedel-Crafts catalysts, which are optionally modified by the action of phenols;

(iv) copolymers based on natural terpenes, for example styrene/terpene, α-methylstyrene/terpene and vinyltoluene/terpene.

According to one preferred variant, use is made of aliphatic resins belonging to categories (ii) or (iii) for which mention may be made, as examples of commercially available resin, of:

(ii) Escorez® 1310 LC available from Exxon Chemicals, which is a resin obtained by polymerization of a mixture of unsaturated aliphatic hydrocarbons having approximately 5 carbon atoms, and which has a softening temperature of 94° C. and a Mw of approximately 1800 Da; Escorez® 5400 also from the company Exxon Chemicals, which is a resin obtained by polymerization then hydrogenation of a mixture of unsaturated aliphatic hydrocarbons having approximately 9 or 10 carbon atoms and which has a softening temperature of 100° C. and a Mw of approximately 570 Da;

(iii) Dercolyte® S115 available from Dérivés Résiniques et Terpéniques (or DRT), which is a terpene resin having a softening temperature of 115° C. and a Mw of approximately 2300 Da.

According to one preferred variant, the constituent HMPSA composition a of the layer A essentially consists of:

from 40% to 70% of the composition a1 of styrene block copolymers; and from 30% to 60% of at least one tackifying resin a2 having a softening temperature of between 5 and 140° C.

According to another preferred variant, the constituent HMPSA composition a of the layer A comprises or essentially consists of:

from 50% to 70% of the composition a1 of styrene block copolymers; and from 30% to 50% of at least one tackifying resin a2 having a softening temperature of between 5 and 140° C.

According to yet another preferred variant, the constitutive HMPSA composition a of the layer A can also comprise, in addition to the composition a1 and the tackifying resin(s) a2, from 0.1% to 2% of one or more stabilizers (or antioxidants). These compounds are introduced in order to protect the composition against degradation resulting from a reaction with oxygen which is capable of forming from the action of heat, light or residual catalysts on certain raw materials such as tackifying resins. These compounds can include primary antioxidants, which trap free radicals and which are generally substituted phenols, such as Irganox® 1010 from Ciba. The primary antioxidants can be used alone or in combination with other antioxidants, such as phosphites, for instance Irgafos® 168 also from Ciba, or else with UV-stabilizers such as amines.

The composition a can also comprise a plasticizer, but in an amount not exceeding 5%. As plasticizer, use may be made of a paraffinic and naphthenic oil (such as Primol® 352 from the company ESSO) optionally comprising aromatic compounds (such as Nyflex 222B).

Finally, the composition a can comprise mineral or organic fillers, pigments or dyes.

The adhesive composition a can be prepared, in the form of granules having a size between 1 and 10 mm, preferably between 2 and 5 mm, by simple hot-mixing of its ingredients, between 150 and 200° C., preferably at approximately 160° C., by means of a twin-screw extruder equipped with a tool for cutting the extruded product as it leaves the die.

In addition to the layers A, B and C, the multilayer film according to the invention can also comprise other thin layers required for preparing the packaging, for instance:

an intermediate layer (also described as tie) D, connecting the layer A to the layer B, and/or a tie layer E, connecting the layer A to the layer C, or a rigid layer required for the mechanical strength of the receptacle, or a printable layer, or else a layer with a barrier effect against oxygen, water vapor or else carbon monoxide.

The tie layers D and E consist of identical or different compositions of polymers. Said polymers are generally chosen from polyethylene homopolymers or copolymers, polypropylene homopolymers or copolymers, copolymers of ethylene and polar comonomers, or else grafted polyolefin copolymers. For greater detail regarding the composition of the tie layers, reference is made to document US 2013/0029553.

The materials that can be used to form the optional other layers may be identical or different and generally comprise thermoplastic polymers which can be chosen from the polymers mentioned above for the layer B.

The thickness of the layer A can range, preferably, from 8 to 25 μm, even more preferentially from 10 to 20 μm.

The thickness of the tie layers D and E is, for its part, generally between 1 and 10 μm, and preferably between 2 and 8 μm.

The thickness of the 2 layers B and C, and also of the other layers optionally used in the multilayer film according to the invention, is capable of varying within a wide range of from 5 to 150 μm.

According to one implementation variant, the multilayer film according to the invention is a film comprising 5 layers consisting of the adhesive layer A, the 2 intermediate layers D and E and the 2 external layers B and C, according to the sequence B/D/A/E/C in which the "/" sign signifies that the faces of the layers in question are in direct contact.

According to another implementation variant, the multilayer film according to the invention is a film comprising 3 layers consisting of the adhesive layer A and the 2 external layers B and C, according to the sequence B/A/C.

The present invention also relates to a process for producing the multilayer film as defined previously, characterized in that it comprises the co-extrusion of the hot-melt self-adhesive composition a and of the compositions b and c, at a temperature of between 150° C. and 200° C.

According to one variant of said process, the co-extrusion is carried out by using a rectangular die.

According to one preferred variant, the co-extrusion is carried out by means of a blow-molding process (also referred to as bubble blowing), said process comprising:

(i) the introduction, into separate extruders, constituent compositions and materials of the layers A, B, C, and where appropriate D and E, in the form of granules having a size of between 1 and 10 mm, preferably between 2 and 5 mm, then (ii) the conversion by heating of said granules to the viscous liquid state, then (iii) the passing of the corresponding streams through an extrusion head comprising a set of coplanar and concentric annular dies, each brought to a temperature below 200° C., so as to form a tubular bubble comprising several layers, in which the order of the layers corresponds to that desired for the final film, then (iv) the radial (relative to the plane of the annular dies) expansion and the drawing (in the direction perpendicular to said plane) of the bubble, then (v) the cooling of said bubble.

The geometrical characteristics of the dies, like the parameters of the process, such as the degree of radial expansion and the drawing speed, are set so as to obtain the desired thickness for the various constituent layers of the multilayer film. For a more thorough description of the co-extrusion bubble blowing process, reference is in particular made to patent application US 2013/0029553.

According to one preferred variant of the process according to the invention, the extrusion head used in step (iii) is a monoblock extrusion head, in which the annular dies are brought to one and the same temperature below 200° C. Advantageously, such extrusion heads equip the vast majority of the co-extrusion blow-molding devices available on the market, thus making the process easier to implement.

Preferably, the co-extrusion temperature varies within a range of from 170 to 190° C.

The present invention also relates to a resealable packaging comprising:
- a PET-based receptacle which consists either of amorphous PET or of a bilayer system of amorphous PET and of semicrystalline PET, said receptacle having a flat bottom and a perimeter in the form of a flat band, and
- a seal consisting of the multilayer film as defined previously, the heat-sealable and cleavable layer (C) of which is heat-sealed on the perimeter of the receptacle, in contact with amorphous PET.

Said packaging is produced by food-processing manufacturers by placing the food product to be packaged on the flat bottom of the receptacle, then by attaching the multilayer film according to the invention on the perimeter of said receptacle by heat-welding on the amorphous PET at a temperature of between 110 and 160° C.

The examples that follow are given purely by way of illustration of the invention and should not in any way be interpreted in order to limit the scope thereof.

EXAMPLE A (Reference): Extrudable Hot-Melt Self-Adhesive Composition

A composition consisting, on the basis of % weight/weight, of 59.5% of Kraton® D1113BT, 25% of Escorez® 1310 LC, 15% of Dercolyte® S115 and 0.5% of Irganox® 1010 is prepared, in the form of a viscous liquid, by simply mixing the ingredients at 160° C. by means of a twin-screw extruder.

An MFI of 57 g/10 minutes is measured.

EXAMPLE B (Reference): Three-Layer Film BAC Comprising a Layer A Consisting of the Composition of Example A and a Heat-Sealable and Cleavable Layer C Consisting of LDPE This three-layer film is produced by means of a continuously operating co-extrusion bubble blowing pilot-scale device equipped with a monoblock extrusion head brought to a temperature of 190° C., in which device 3 extruders are fed in the following way:
- one is fed with the composition of example A, and
- the other two are fed with low-density polyethylene (or LDPE); the 3 compositions being in the form of granules having a size of approximately 4 mm.

The process parameters are adjusted so as to produce a three-layer film consisting:
- as layer A, of a layer with a thickness of 15 µm consisting of the extrudable hot-melt self-adhesive composition of example A,
- as complexable thin layer B, of a layer with a thickness of 30 µm consisting of LDPE;
- as heat-sealable and cleavable layer C, of a layer with a thickness of 15 µm also consisting of LDPE.

Among the parameters usually set, mention may made of a degree of radial expansion of the bubble equal to 3, a drawing speed of 7 m/minute and an overall throughput of 11 kg/hour.

The three-layer film thus obtained has a total thickness of 60 µm and a length of 50 m and is packaged in the form of a reel with a machine width of 250 mm.

It is subjected to tests B.1. and B.2. described below.

Test B.1.: Measurement of the Force of the First Opening by T-Peeling, at 23° C., of the Three-Layer Film Previously Heat-Welded on a PET/PE Complex A sample in the form of a rectangular sheet with A4 format (21×29.7 cm) is cut out from the three-layer film previously obtained.

The external face of the complexable layer B of this sample is:
- in a first step, subjected to a corona surface treatment (by means of a plasma), then
- in a second step, complexed (in other words laminated) on a PET film having a thickness of 23 µm by means of a polyurethane-based solvent-based adhesive and using a coating device of the Mayer bar type.

The rectangular sheet is then placed under pressure for 24 h.

Rectangular test specimens E1 that are 10 cm long and 2 cm wide are then cut from this rectangular sheet.

Rectangular test specimens E2 that are 10 cm long and 2 cm wide are, moreover, cut from a rigid block consisting of a sheet of PET having a thickness of approximately 200 µm, covered with a layer of PE.

The 2 test specimens E1 and E2 are then placed facing one another, in such a way that the heat-sealable and cleavable layer of E1 is in contact with the layer of PE of E2.

Partial sealing is then carried out using two heating clamping jaws at 130° C. applied under a pressure of 6 bar for 1 second, so as to obtain a sealed region of rectangular shape (8 cm in length and 1 cm in width). Said sealed region is placed in the lengthwise direction and in contact with one of the small sides of the rectangular test specimens E1 and E2 thus joined, in order to leave on the other small side of said test specimens a band of film approximately 2 cm in length originating from E1, that is free and not sealed on the end of the rigid plate of E2 located opposite.

The band of free film of E1 and the end of the rigid plate of E2 are attached to two holding devices (known as jaws) respectively connected to a stationary part and a movable part of a tensile testing device, which are located on a vertical axis. This tensile testing device is a dynamometer.

While a drive mechanism imparts a uniform rate of 300 mm/minute to the movable part, resulting in the peeling of the two sealed test specimens E1 and E2, the ends gradually move along a vertical axis with the formation of an angle of 180°. A force sensor connected to said movable part measures the force withstood by the test specimen thus held. The measurement is carried out in a climate-controlled room maintained at a temperature of 23° C. The force obtained is shown in table 1.

Test B.2. Measurement of the Force of the Second Opening by T-Peeling, at 23° C., of the Three-Layer Film Heat-Welded on a PET/PE Complex The 2 parts of the preceding test specimen are, after peeling, repositioned facing one another and brought into contact manually. They are then subjected to a pressure exerted by means of a roller with a weight of 2 kg, with which a to-and-fro movement is carried out in a direction parallel to the length of the test specimen.

A tensile test specimen is thus obtained which is identical in shape to that prepared for the preceding peeling test, which is then repeated.

The force obtained is shown in table 1.

EXAMPLE 1

Three-Layer Film Bac Comprising a Layer A Consisting of the Composition of Example A and a Heat-Sealable and Cleavable Layer C According to the Invention First of all, an amorphous linear copolyester C1 is prepared according to the 3-step procedure indicated below, said copolyester having been obtained by means of a reaction for polycondensation of a composition m of monomers which consists, on the basis of the total number of moles of monomers, of:
  50 mol % of monoethylene glycol,
  30 mol % of dimethyl terephthalate, and
  20 mol % of isophthalic acid.
  1st Step:
  100 g of monoethylene glycol (1.61 mol), 291 g of dimethyl terephthalate (1.5 mol) and 0.19 g of titanium-based catalyst (of formula Ti(nBuO)$_4$) and 0.05 g of zinc-based catalyst (zinc acetate) are placed in a 1-liter closed reaction vessel equipped with a stirrer, with a distillation column, with heating means and with a thermometer and connected to a vacuum pump. The assembly is heated from ambient temperature to 190° C. for 5 hours in order to eliminate the methanol formed.
  2nd Step:
  70 g of monoethylene glycol (1.13 mol) and 166 g of isophthalic acid (1 mol) are then placed, at 190° C., in the 1st-step reaction vessel under nitrogen flushing. The polycondensation reaction is continued for 5 hours from 190° C. to 230° C. in order to eliminate the water formed. The progression of the reaction is monitored by measuring the acid number AN expressed in mg KOH/g.
  3rd Step:
  The reaction mixture of the 2nd step is brought to a temperature of 250° C. under a pressure of approximately 2 mbar for 10 hours in order to increase the molecular weight.
  The amorphous linear copolyester C1 obtained has a molecular weight Mw of 35 kDa. Its softening temperature is 175° C.

The copolyester C1 thus obtained is made into granules having a size of approximately 4 mm after extrusion, and is used as constituent material of the layer C of the three-layer film BAC.

By reproducing the process of example B, and in particular by bringing the temperature of the monoblock extrusion head to the same temperature of 190° C., a three-layer film BAC is produced which consists:
  as layer A, of a layer with a thickness of 15 µm consisting of the extrudable hot-melt self-adhesive composition of example A,
  as complexable thin layer B, of a layer with a thickness of 30 µm consisting of LDPE;
  as heat-sealable and cleavable layer C, of a layer having a thickness of 8 µm also consisting of the amorphous linear copolyester C1 prepared as indicated above.

The three-layer film thus obtained has a total thickness of 53 µm and a length of 50 m and is packaged in the form of a reel with a machine width of 250 mm.

Tests B.1. and B.2. of example B are then repeated using, as rigid plate for producing the test specimens E2, a plate consisting exclusively of a sheet of amorphous PET, having a width of approximately 200 µm (not covered with a layer of PE).

The forces obtained are shown in table 1.

TABLE 1

| | Example B (reference) | Example 1 | Example 2 |
|---|---|---|---|
| Constitutive material of the rigid plate of the test specimen E2 mentioned in test B1 | PET/PE | PET | PET |
| Force of the 1st opening (N/cm) | 4.0 | 5.4 | 5 |
| Force of the 2nd opening (N/cm) | 1.2 | 2 | 1.1 |

EXAMPLE 2

Three-Layer Film BAC Comprising a Layer A Consisting of the Composition of Example A and a Heat-Sealable and Cleavable Layer C According to the Invention First of all, an amorphous linear copolyester C1 is prepared according to the 2-step procedure indicated below, said copolyester having been obtained by means of a reaction for polycondensation of a composition m of monomers which consists, on the basis of the total number of moles of monomers, of:
  50 mol % of monoethylene glycol,
  30 mol % of terephthalic acid, and
  20 mol % of azelaic acid.
  1st Step:
  100 g of monoethylene glycol (1.61 mol), 142 g of terephthalic acid (0.85 mol), 107 g of azelaic acid (0.57 mol) and 0.0011 g of titanium-based catalyst (of formula Ti 2-EtHexO)$_4$) and 0.04 g of germanium-based catalyst (germanium dioxide) are placed in a 1-liter closed reaction vessel equipped with a stirrer, with a distillation column, with heating means and with a thermometer and connected to a vacuum pump. The assembly is heated from 170° C. to 230° C. for 5 hours in order to eliminate the water formed.
  The progression of the reaction is monitored by measuring the acid number AN expressed in mg KOH/g.
  2nd Step:
  The reaction mixture of the 1st step is brought to a temperature of 250° C. under a pressure of approximately 2 mbar for 10 hours in order to increase the molecular weight.
  The amorphous linear copolyester C1 obtained has a molecular weight Mw of 75 kDa. Its softening temperature is 150° C.

Example 1 is then repeated with the amorphous linear copolyester C1 thus obtained.

The forces obtained at the end of tests B.1. and B.2. are shown in table 1.

It is thus noted that the three-layer films of examples 1 and 2, that can be produced by co-extrusion at a temperature of 190° C., exhibit, after heat-sealing on a PET support, properties of easy opening and substantially hermetic resealing properties that are of the same level as the reference three-layer film of example B that was heat-sealed on a PE layer.

The invention claimed is:
1. A multilayer film comprising:
  an adhesive layer A having a thickness of 7 to 50 µm and consisting of an extrudable hot-melt self-adhesive com- position a which has a melt flow index (or MFI), measured for a temperature of 190° C. and a total weight of 2.16 kg, ranging from 0.01 to 200 g/10 minutes and which comprises, on the basis of the total weight of said composition a:
from 40% to 70% by weight of a composition a1 of styrene block copolymers with at least one elastomer block, said composition a1 consisting of, on the basis of its total weight:
of 30% to 90% by weight of at least one diblock copolymer of styrene-isoprene block copolymer (SI), styrene-butadiene/isoprene block copolymer (SBI), styrene-isoprene/butadiene block copolymer (SIB), styrene-butadiene block copolymer (SB), styrene-ethylene/butylene block copolymer (SEB), styrene-ethylene/propylene block copolymer (SEP), and
of 10% to 70% by weight of at least one triblock copolymer of styrene-isoprene-styrene block copolymer (SIS), styrene-isoprene/butadiene-styrene block copolymer (SIBS), styrene-butadiene-styrene block copolymer (SBS), styrene-ethylene/butylene-styrene block copolymer (SEBS), styrene-ethylene/propylene-styrene block copolymer (SEPS);
the total content of styrene units of said composition a1 being 10% to 40% by weight on the basis of the total weight of a1; and
from 30% to 60% by weight of one or more tackifying resins a2 having a softening temperature of between 5 and 140° C.;
a complexable thin layer B consisting of a thermoplastic b; and
a heat-sealable and cleavable layer C having a thickness of 10 to 150 μm;
the layers B and C being linked to one another by the layer A; and
wherein in said film the layer C consists of a composition c of, on the basis of the total weight of c, a content by weight of at least 95% of at least one linear copolyester C1 obtained by polycondensation of a composition m of monomers of:
at least one diol (i),
at least one compound (ii) that is terephthalic acid or a diester derivative thereof, optionally substituted with an alkyl radical, and
at least one compound (iii) that is an aromatic or aliphatic dicarboxylic acid or a diester or anhydride derivative thereof;
the amounts of the monomers (i), (ii) and (iii) used in the polycondensation being such that the softening temperature of C1 is below 190° C.

2. The multilayer film as claimed in claim 1, wherein the softening temperature of the linear copolyester C1 included in composition c of the C is below 180° C.

3. The multilayer film as claimed in claim 1, wherein the linear copolyester C1 is obtained by polycondensation of a composition m consisting of, on the basis of contents expressed as mol % per 100 mol of monomers, of:
approximately 50% of diol (i),
from 10% to 38% of compound (ii), and
from 12% to 40% of compound (iii).

4. The multilayer film as claimed in claim 1, wherein ethylene glycol is used as diol (i).

5. The multilayer film as claimed in claim 1, wherein composition a of the layer A has a melt flow index of 2 to 70 g/10 minutes.

6. The multilayer film as claimed in claim 1, wherein the composition a1 of styrene block copolymers included in the composition a of the layer A consists of an SIS triblock copolymer and an SI diblock copolymer.

7. The multilayer film as claimed in claim 1, wherein the resin(s) a2 included in the composition a of the layer A are:
(ii) resins obtained by hydrogenation, polymerization or copolymerization with an aromatic hydrocarbon of mixtures of unsaturated aliphatic hydrocarbons having approximately 5, 9 or 10 carbon atoms resulting from petroleum fractions; or
(iii) terpene resins resulting from the polymerization of terpene hydrocarbons in the presence of Friedel-Crafts catalysts, which are optionally modified by the action of phenols.

8. The multilayer film as claimed in claim 1, wherein composition a of the layer A comprises:
from 50% to 70% of the composition a1 of styrene block copolymers; and
from 30% to 50% of tackifying resin a2.

9. The multilayer film as claimed in claim 1, wherein the multilayer film also comprises a tie layer D, connecting the layer A to the layer B, and/or a tie layer E, connecting the layer A to the layer C.

10. The multilayer film as claimed in claim 1, wherein the thickness of the layer A ranges from 8 to 25 μm.

11. A resealable packaging comprising:
a PET-based receptacle which consists either of amorphous PET or of a bilayer system of amorphous PET and of semicrystalline PET, said receptacle having a flat bottom and a perimeter in the form of a flat band, and
a seal consisting of the multilayer film as defined in claim 1, the layer (C) of which is heat-sealed on the perimeter of the receptacle, in contact with amorphous PET.

12. A process for producing the multilayer film as defined in claim 1, said process comprising co-extrusion of the composition a, the thermoplastic b and the composition c, at a temperature of between 150° C. and 200° C.

13. The production process as claimed in claim 12, wherein the co-extrusion is carried out by blow-molding.

14. The production process as claimed in claim 12, comprising:
(i) the introduction, into separate extruders, of constituent compositions and materials of the layers A, B, C, and optionally a tie layer D and a tie layer E, in the form of granules having a size of between 1 and 10 mm, then
(ii) the conversion by heating of said granules to a viscous liquid state forming viscous compositions, then
(iii) the passing of the viscous compositions through an extrusion head comprising a set of coplanar and concentric annular dies, each brought to a temperature of between 150° C. and 200° C., so as to form a tubular bubble comprising several layers, in which the order of the layers corresponds to that desired for the final film, then
(iv) radial expansion and the drawing of the bubble, then
(v) cooling of said bubble.

15. The production process as claimed in claim 14, wherein the extrusion head used in step (iii) is a monoblock extrusion head, in which the annular dies are brought to one and the same temperature of between 150° C. and 200° C.

* * * * *

UNITED STATES PATENT AND TRADEMARK OFFICE
CERTIFICATE OF CORRECTION

| | |
|---|---|
| PATENT NO. | : 11,078,004 B2 |
| APPLICATION NO. | : 15/745621 |
| DATED | : August 3, 2021 |
| INVENTOR(S) | : Christophe Robert et al. |

It is certified that error appears in the above-identified patent and that said Letters Patent is hereby corrected as shown below:

On the Title Page

Item (73): reads "BOSTIK SA, La Plaine Saint Denis (FR)" should read --BOSTIK SA, Colombes, (FR)--.

Signed and Sealed this
Twenty-eighth Day of March, 2023

Katherine Kelly Vidal
*Director of the United States Patent and Trademark Office*